United States Patent
Lee et al.

(10) Patent No.: US 9,093,873 B2
(45) Date of Patent: Jul. 28, 2015

(54) EXPLOSION-PROOF, COMPOUND ELECTRIC MOTOR

(75) Inventors: Ho-Kyoung Lee, Ulsan (KR); Nam-Gak Hur, Ulsan (KR); Sung-Hyo Kwak, Ulsan (KR)

(73) Assignee: HYUNDAI HEAVY INDUSTRIES CO., LTD. (KR)

(*) Notice: Subject to any disclaimer, the term of this patent is extended or adjusted under 35 U.S.C. 154(b) by 282 days.

(21) Appl. No.: 13/817,154

(22) PCT Filed: Aug. 10, 2011

(86) PCT No.: PCT/KR2011/005850
§ 371 (c)(1),
(2), (4) Date: Feb. 15, 2013

(87) PCT Pub. No.: WO2012/023739
PCT Pub. Date: Feb. 23, 2012

(65) Prior Publication Data
US 2013/0140929 A1 Jun. 6, 2013

(30) Foreign Application Priority Data
Aug. 16, 2010 (KR) .................... 20-2010-0008494 U

(51) Int. Cl.
*H02K 5/136* (2006.01)
*H02K 5/22* (2006.01)
(52) U.S. Cl.
CPC ............... *H02K 5/136* (2013.01); *H02K 5/225* (2013.01)

(58) Field of Classification Search
CPC ............................... H02K 5/136; H02K 5/225
USPC ........................................................ 310/88, 89
See application file for complete search history.

(56) References Cited

U.S. PATENT DOCUMENTS

| 3,447,000 A | * | 5/1969 | Dugan et al. ..................... 310/50 |
| 4,094,361 A | * | 6/1978 | Yago ............................... 169/48 |
| 4,174,013 A | * | 11/1979 | Yago ............................. 180/6.2 |
| 5,753,986 A | * | 5/1998 | Ohtani ............................ 310/56 |
| 5,856,717 A | * | 1/1999 | Stimson .......................... 310/71 |

(Continued)

FOREIGN PATENT DOCUMENTS

| JP | 58124063 | 8/1983 |
| JP | 07042997 | 2/1995 |

(Continued)

OTHER PUBLICATIONS

PCT Written Opinion—PCT/KR2011/005850 issued on Mar. 14, 2012, citing JP2000-245099, JP2009-278714, JP07-042997 and JP2007-282348.
International Search Report—PCT/KR2011/005850 dated Mar. 14, 2012.

*Primary Examiner* — Alex W Mok
(74) *Attorney, Agent, or Firm* — Cantor Colburn LLP

(57) ABSTRACT

Provided is a combined explosion-proof electromotor, which includes a body in which an interior space is formed and whose one end is open in an axial direction, a terminal box whose one end is open in the axial direction so as to face the open end of the body and in which a space is formed to hold terminal cables extending from the outside, and a middle plate that is disposed between the opposing ends of the body and the terminal box which are connected by separate fastening means and that includes terminal insertion holes through which ends of the terminal cables are inserted into the body.

5 Claims, 2 Drawing Sheets

(56) References Cited

U.S. PATENT DOCUMENTS

| | | |
|---|---|---|
| 6,372,983 B1 * | 4/2002 | Knaggs .................... 174/17 LF |
| 6,600,247 B1 * | 7/2003 | Stimson .................... 310/89 |
| 2007/0159017 A1 * | 7/2007 | Martin et al. .................... 310/88 |
| 2008/0001489 A1 * | 1/2008 | Paone et al. .................... 310/77 |
| 2008/0265519 A1 * | 10/2008 | Zebrowski .................... 277/510 |
| 2010/0176673 A1 * | 7/2010 | Wright et al. .................... 310/88 |
| 2011/0031830 A1 * | 2/2011 | Oleson et al. .................... 310/88 |

FOREIGN PATENT DOCUMENTS

| | | |
|---|---|---|
| JP | 2000245099 | 9/2000 |
| JP | 2003018797 | 1/2003 |
| JP | 2007282348 | 10/2007 |
| JP | 2009278714 | 11/2009 |

* cited by examiner

EXPLOSION-PROOF, COMPOUND ELECTRIC MOTOR

TECHNICAL FIELD

The present invention relates to an explosion-proof electromotor. More particularly, the present invention relates to a combined explosion-proof electromotor of a partitioned structure, to which a middle plate partitioning a body and a terminal box is applied, capable of meeting requirements of each of different explosion-proof types specified by International Electrotechnical Commission (IEC) standards and connecting the different explosion-proof types.

BACKGROUND ART

Explosion-proof electromotors are special apparatuses used in the petrochemical industry, in which risk of explosion is high. The explosion-proof electromotors include, for example, a flameproof enclosure type "Ex d" and an increased safety type "Ex e."

The flameproof enclosure type "Ex d" has a structure where, in case of any explosion inside the enclosure, the enclosure withstands the pressure of the explosion, and no flame inside the enclosure is transmitted to an external explosive atmosphere through any joint, opening, etc. of the enclosure.

The increased safety type "Ex e" has a structure that prevents sparks, arcs or high-temperature zones from occurring in electric apparatuses to thereby increase mechanical and electrical safety.

This flameproof enclosure type electromotor is characterized in that its thickness is greater than those of the other typical products in order to secure structural rigidity of the enclosure that is capable of withstanding the explosion pressure.

For this reason, a terminal box of the flameproof enclosure type electromotor is heavier and more expensive, and is restricted by structural modification such as a change in the number of lead wires of a cable because of stricter explosion-proof certification testing required by the standards, compared to that of the increased safety type electromotor.

DISCLOSURE OF INVENTION

Technical Problem

Accordingly, the present invention has been made keeping in mind the above problems occurring in the related art, and an objective of the present invention is provide a combined explosion-proof electromotor to which a middle plate forming a partition wall between a body and a terminal box thereof is applied, thereby allowing the body to withstand the pressure of an explosion that may occur inside the body, and preventing any flame inside the body from being transmitted to an external explosive atmosphere through a joint or opening of the body to thereby prevent any secondary explosion which may take place outside the body. Another objective of the present invention is provide a combined explosion-proof electromotor that prevents sparks, arcs or high-temperature zones from occurring inside a terminal box to entirely eliminate a fire hazard, thereby making it possible to increase mechanical and electrical safety.

Technical Solution

According to an aspect of the present invention, there is provided a combined explosion-proof electromotor, which includes: a body in which an interior space is formed and whose one end is open in an axial direction; a terminal box whose one end is open in the axial direction so as to face the open end of the body and in which a space is formed to hold terminal cables extending from the outside; and a middle plate that is disposed between the opposing ends of the body and the terminal box which are connected by separate fastening means and that includes terminal insertion holes through which ends of the terminal cables are inserted into the body.

According to an embodiment of the present invention, the body and the terminal box may include a plurality of first and second fastening holes, which extend in an axial direction so as to make the same arrangement and are formed along edges of the opposing ends thereof, respectively. The middle plate may include a plurality of third fastening holes, which are formed along an edge thereof, are aligned with the first and second fastening holes, and allow the fastening means to be fastened through the first and second fastening holes.

According to another embodiment of the present invention, the ends of the terminal cables may be fixed using explosion-proof cable glands in order to maintain the body and the terminal box in a sealed state.

According to yet another embodiment of the present invention, the middle plate may be configured so that a central portion of one face thereof is pressed and partially inserted into the space of the body and so that the other face thereof is formed so as to have a concave portion. The terminal box may include a coupling plate, which is formed at one end thereof that faces one end of the body and is in contact with the other face of the middle plate, and be configured so that an inner circumferential edge thereof protrudes around a through-hole in an axial direction and is inserted in contact with the concave portion.

Advantageous Effects

According to the combined explosion-proof electromotor, the middle plate is formed so as to connect the body and the terminal body having different explosion-proof types, so that the body can withstand the pressure of any abnormal explosion. No flame inside the body is transmitted to an external explosive atmosphere through any joint or opening of the body, and thus any secondary explosion can be prevented.

Further, the terminal box entirely prevents sparks, arcs, or high-temperature zones from being generated from the inside thereof, so that a fire hazard is minimized to be able to increase mechanical and electrical safety.

BRIEF DESCRIPTION OF DRAWINGS

These and/or other aspects and advantages of the invention will become apparent and more readily appreciated from the following description of the embodiments, taken in conjunction with the accompanying drawings of which.

BEST MODES OF CARRYING OUT THE INVENTION

Reference will now be made in detail to an exemplary embodiment of the present invention with reference to the accompanying drawings.

Technical terms, as will be mentioned hereinafter, are terms defined in consideration of their function in the present invention, so that they should be defined based on the contents of this specification.

Figure 1:
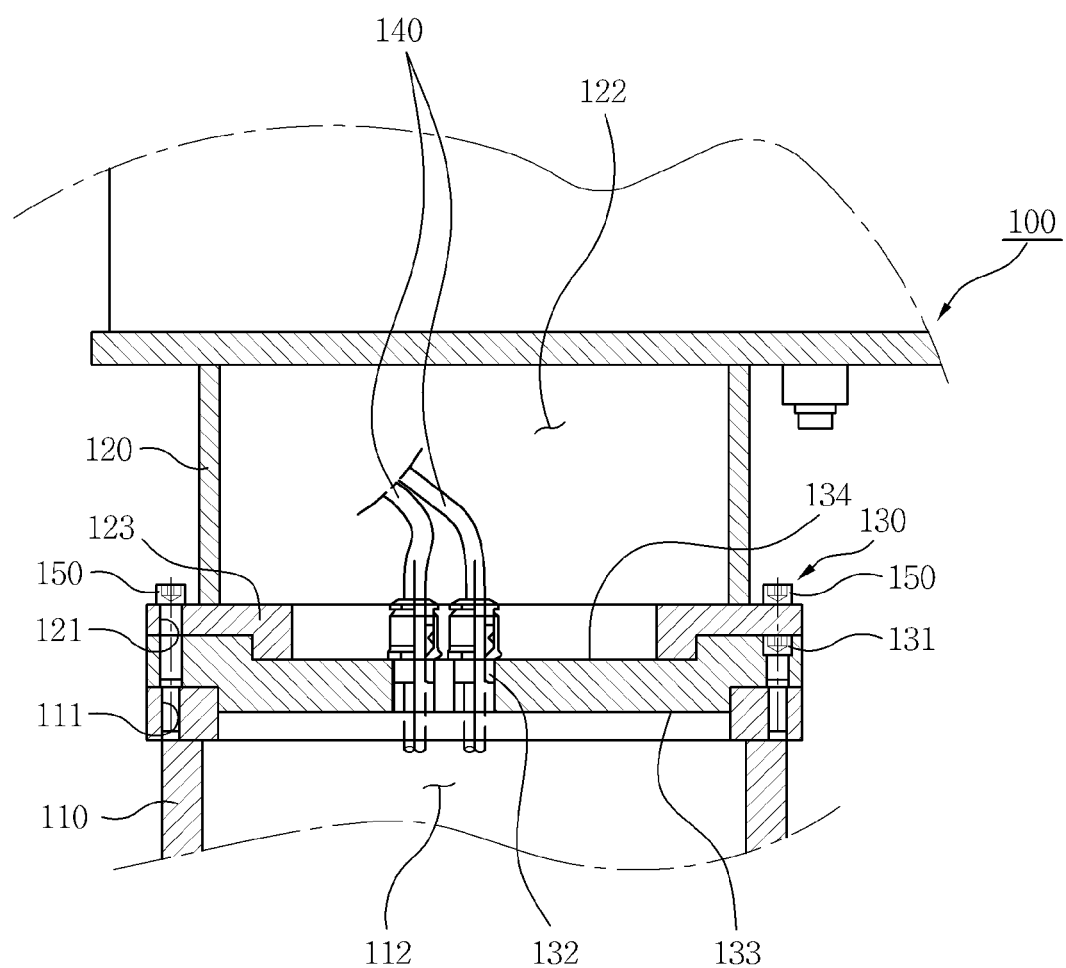
FIG. 1 is a cross-sectional view showing the structure of a combined explosion-proof electromotor according to an exemplary embodiment of the present invention.
Figure 2:
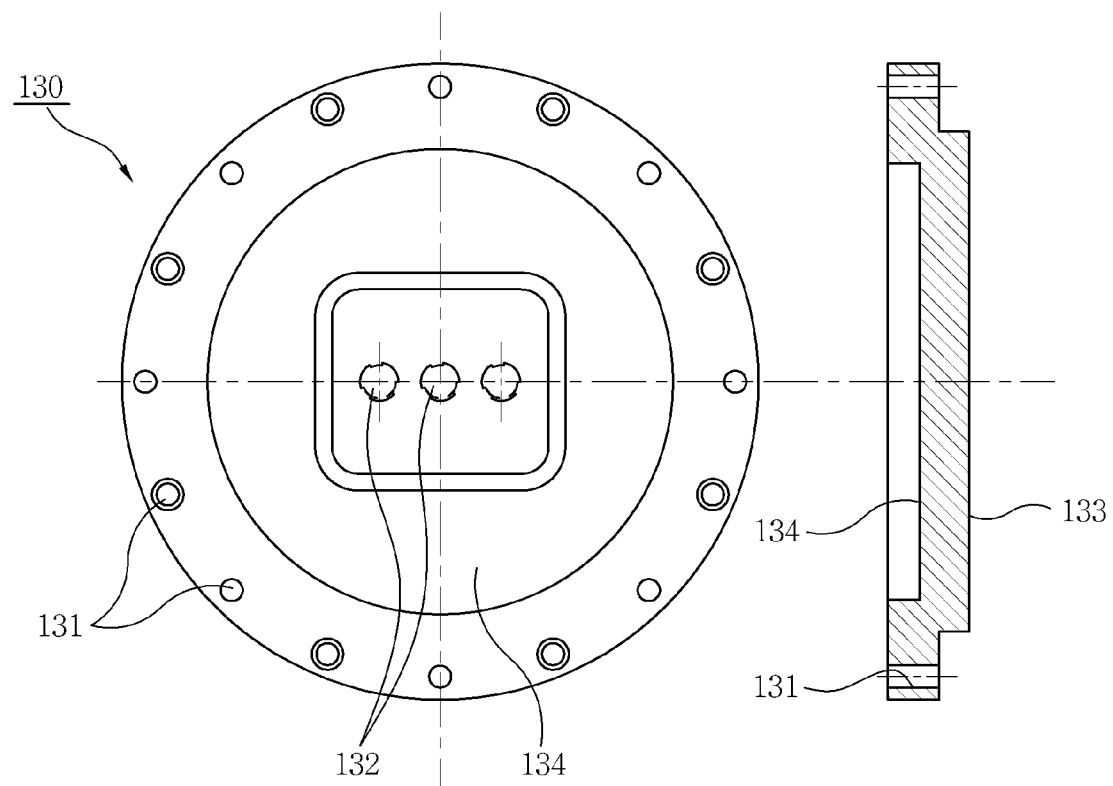
FIG. 2 shows a middle plate of the combined explosion-proof electromotor according to the exemplary embodiment of the present invention.

As shown in FIGS. 1 and 2, a combined explosion-proof electromotor 100 according to an exemplary embodiment of the present invention includes a body 110 in which an interior space 112 is formed and whose one end is open in an axial direction, a terminal box 120 whose one end is open in the axial direction so as to face the open end of the body 110 and in which a space 122 is formed to hold terminal cables 140 extending from the outside, and a middle plate 130 that is disposed between the opposing axial ends of the body 110 and the terminal box 120 which are connected by separate fastening means 150 and that includes terminal insertion holes 132 through which ends of the terminal cables 140 are inserted into the body 110.

Each of the body 110 and the terminal box 120 preferably has the shape of a cylinder, one axial end of which is open, but may also be formed in various shapes without being limited to this shape.

Here, the opposing ends of the body 110 and the terminal box 120 are provided with a plurality of first and second fastening holes 111 and 121, which extend in an axial direction so as to make the same arrangement, along their edges, respectively.

The middle plate 130 is provided with a plurality of third fastening holes 131 along its edge which are aligned with the first and second fastening holes 111 and 121 and allow the fastening means 150 to be fastened through the first or second fastening holes 111 or 121.

Further, the middle plate 130 is pressed at a central portion of one face thereof. Thereby, a convex portion 133 protrudes from one face of the middle plate 130 so as to be correspondingly inserted into the interior space 112 of the body 110, whereas a concave portion 134 is formed in the other face of the middle plate 130.

Meanwhile, the terminal box 120 is provided with a coupling plate 123, which is in contact with the other face of the middle plate 130, at one end thereof that faces one end of the body 110.

The coupling plate 123 is provided with a through-hole in a central portion thereof in an axial direction so that the terminal cables 140, which will be described below, can be inserted through the through-hole. The coupling plate 123 is configured so that its inner circumferential edge protrudes around the through-hole in an axial direction and thus is inserted so as to be in contact with the concave portion 134.

MODES OF CARRYING OUT THE INVENTION

The middle plate 130 preferably has the shape of a circular disc so as to be able to be coupled between the opposing ends of the body 110 and the terminal box 120.

The middle plate 130 may have the convex portion 133 axially protruding at the central portion of one face thereof and the concave portion 134 in the other face thereof.

Further, the plurality of second fastening holes 121 may be formed along the outer circumferential edge of the end of the terminal box 120.

Also, when the cables are connected, it is necessary to fix the cables to the middle plate 130 using cable glands. This is a method of maintaining the body and the terminal box in a sealed state so that the body 110 has a flameproof enclosure type and the terminal box 120 has an increased safety type.

That is, the convex portion 133 is inserted into the interior space 112 of the body 110, thereby keeping the middle plate 130 in position, and the terminal box 120 is exactly positioned at its coupling position by the concave portion 134.

Then, the fastening means 150 are fastened through the first fastening holes 111 of the body 110 or the second fastening holes 121 of the terminal box 120, so that the middle plate 130 can be coupled so as to form a partition wall between the body 110 and the terminal box 120.

Consequently, the middle plate is formed as the partition wall between the body and the terminal box, so that the body 110 can withstand the pressure of any explosion that may occur. No flame inside the body is transmitted to an external explosive atmosphere through any joint or opening of the body 110, and thus any secondary explosion can be prevented.

Further, the terminal box 120 prevents sparks, arcs, or high-temperature zones from being generated from the inside thereof, so that a fire hazard is entirely prevented to be able to increase mechanical and electrical safety.

While an exemplary embodiment of the present invention has been disclosed herein, it would be appreciated by those skilled in the art that changes may be made in this embodiment without departing from the principles and spirit of the invention, the scope of which is defined in the claims and their equivalents.

INDUSTRIAL APPLICABILITY

The combined explosion-proof electromotor employs a middle plate partitioning a body and a terminal box thereof, so that it can meet the requirements of each of different explosion-proof types specified by IEC standards and connect the different explosion-proof types.

The invention claimed is:

1. A combined explosion-proof electromotor comprising:
a body in which an interior space is formed and whose one end is open in an axial direction;
a terminal box whose one end is open in the axial direction so as to face the open end of the body and in which a space is formed to hold terminal cables extending from the outside; and
a middle plate that is disposed between the opposing ends of the body and the terminal box which are connected by separate fastening means and that includes terminal insertion holes through which ends of the terminal cables are inserted into the body,
wherein the middle plate is configured so that a central portion of one face thereof is pressed and partially inserted into the space of the body and so that the other face thereof is formed so as to have a concave portion; and
the terminal box includes a coupling plate, which is formed at one end thereof that faces one end of the body and is in contact with the other face of the middle plate, and is configured so that an inner circumferential edge thereof protrudes around a through-hole in an axial direction and is inserted in contact with the concave portion.

2. The combined explosion-proof electromotor according to claim 1, wherein:
the body and the terminal box include a plurality of first and second fastening holes, which extend in an axial direction so as to make the same arrangement and are formed along edges of the opposing ends thereof, respectively; and
the middle plate includes a plurality of third fastening holes, which are formed along an edge thereof, are aligned with the first and second fastening holes, and allow the fastening means to be fastened through the first and second fastening holes.

3. The combined explosion-proof electromotor according to claim 2, wherein the ends of the terminal cables are fixed using explosion-proof cable glands in order to maintain the body and the terminal box in a sealed state.

4. A combined explosion-proof electromotor comprising:
a body in which an interior space is formed and whose one end is open in an axial direction;
a terminal box whose one end is open in the axial direction so as to face the open end of the body and in which a space is formed to hold terminal cables extending from the outside; and
a middle plate that is disposed between the opposing ends of the body and the terminal box which are connected by separate fastening means and that includes terminal insertion holes through which ends of the terminal cables are inserted into the body,
wherein the body and the terminal box include a plurality of first and second fastening holes, which extend in an axial direction so as to make the same arrangement and are formed along edges of the opposing ends thereof, respectively; and
the middle plate includes a plurality of third fastening holes, which are formed along an edge thereof, are aligned with the first and second fastening holes, and allow the fastening means to be fastened through the first and second fastening holes.

5. The combined explosion-proof electromotor according to claim 4, wherein the ends of the terminal cables are fixed using explosion-proof cable glands in order to maintain the body and the terminal box in a sealed state.

\* \* \* \* \*